INVENTOR
THOMAS H. FLOWERS

BY Hall + Houghton

ATTORNEYS

Jan. 19, 1954 T. H. FLOWERS 2,666,809

ELECTRICAL SWITCHING SYSTEM

Filed Oct. 26, 1948 6 Sheets-Sheet 2

INVENTOR
THOMAS H. FLOWERS

BY Hall & Houghton

ATTORNEYS

Jan. 19, 1954 T. H. FLOWERS 2,666,809

ELECTRICAL SWITCHING SYSTEM

Filed Oct. 26, 1948 6 Sheets-Sheet 3

Inventor,
Thomas Harold Flowers,
by Hall + Houghton,
Attorneys.

Inventor,
Thomas Harold Flowers
by Hall + Houghton,
Attorneys

Jan. 19, 1954 T. H. FLOWERS 2,666,809

ELECTRICAL SWITCHING SYSTEM

Filed Oct. 26, 1948 6 Sheets-Sheet 5

Inventor,
Thomas Harold Flowers,
by Hall & Houghton,
Attorneys.

Inventor,
Thomas Harold Flowers,
by Hall + Houghton,
Attorneys.

Patented Jan. 19, 1954

2,666,809

UNITED STATES PATENT OFFICE 2,666,809

ELECTRICAL SWITCHING SYSTEM

Thomas Harold Flowers, London, England

Application October 26, 1948, Serial No. 56,619

Claims priority, application Great Britain October 27, 1947

20 Claims. (Cl. 179—15)

This invention relates to electrical communication systems, that is to electrical systems for conveying speech frequency or other signals.

An object of the invention is to provide an improved communication system in which time-spaced signals are employed to convey information.

Reference will be made both to impulses and pulses and by "impulses" is meant a brief change of current in a circuit while "pulses" will be used to define a rhythmic train of impulses.

The invention is especially adapted to automatic telephone exchange systems. In known such systems electrically controlled mechanical devices are employed to connect any one of a plurality of 2-wire or 4-wire speech circuits with any one of a plurality of other circuits or trunks and such connections may be made simultaneously.

The present invention is concerned with making connections between one or more trunks and a common signal circuit adapted to transmit information to the trunks and has for an object to provide improved means for connecting the common signal circuit with a trunk.

A further object of the invention is to provide improved means for connecting any one of a plurality of circuits with any one of a plurality of trunks.

Other objects and features of the invention will be made clear from the following description but in particular the invention comprises in combination a switching system, time division multiplex apparatus providing time spaced signals, a common signal circuit, means for applying said time spaced signals to said common signal circuit, signal suppression gate circuit means connected to said common signal circuit, a plurality of time spaced signal selecting means, first and second circuits for feeding said time spaced signals to said selecting means, means operating in response to signals in said first circuit to produce a pulse in a predetermined one of said selecting means, means for connecting said first circuit to said suppression gate circuit means, a third circuit for connecting together said selecting means and said signal suppression gate circuit means, and means for applying said pulse to said third circuit in such a sense that said pulse suppresses transmission of said time spaced signals through said suppresion gate circuit means to said first circuit. Communication gate circuit means are included in said second circuit and means are provided for applying said pulse to said communication gate circuit means.

A switching system according to the invention also comprises injection gate circuit means connected in said first circuit and a source of marking signals connected to said injection gate circuit means which operate to apply time spaced signals to said selecting means only on coincidence at said injection gate means of time spaced signals and said marking signals. A master source of pulses is provided the impulses of which are synchronous with said time spaced signals and synchronising gate circuit means operate to place said selecting means in communication with said master source of pulses when an impulse is present in said third circuit.

The invention further consists in a switching system which comprises means for producing time-spaced electrical impulses, a plurality of calling circuits arranged to transmit audio-frequency signals, means for modulating said impulses by said audio-frequency signals so that the signals from any one of said calling circuits modulate impulses separated one from the other by predetermined fixed time-intervals, a common signal circuit arranged to transmit the modulated impulses from all said calling circuits, a plurality of trunks, a plurality of communication gate circuit means each connected with one of said trunks and arranged to control the connection of a trunk with said common signal circuit, means for intermittently operating each of said communication gate circuit means so that the trunk connected to an operated gate circuit means is operatively connected with said common signal circuit for transmission of signals on said common signal circuit to said trunk at such times as impulses corresponding to signals on one of said calling circuits appear on said common signal circuit and means for demodulating the impulses received by a trunk whereby audio-frequency signals are transmitted along the trunk.

The invention also provides a switching system wherein audio-frequency signals appearing on any one of a plurality of speech circuits all adapted to be connected simultaneously with a common signal circuit are caused to appear on the common signal circuit as time-spaced impulses and are transmitted over any selected one of a plurality of trunks which is connected with the common signal circuit by gate circuit means operated to connect the common signal circuit operatively with said selected trunk at such times as impulses corresponding to signals on one speech circuit appear on the said common signal circuit.

The invention is illustrated by way of example in the accompanying drawings in which.

Figure 3A:
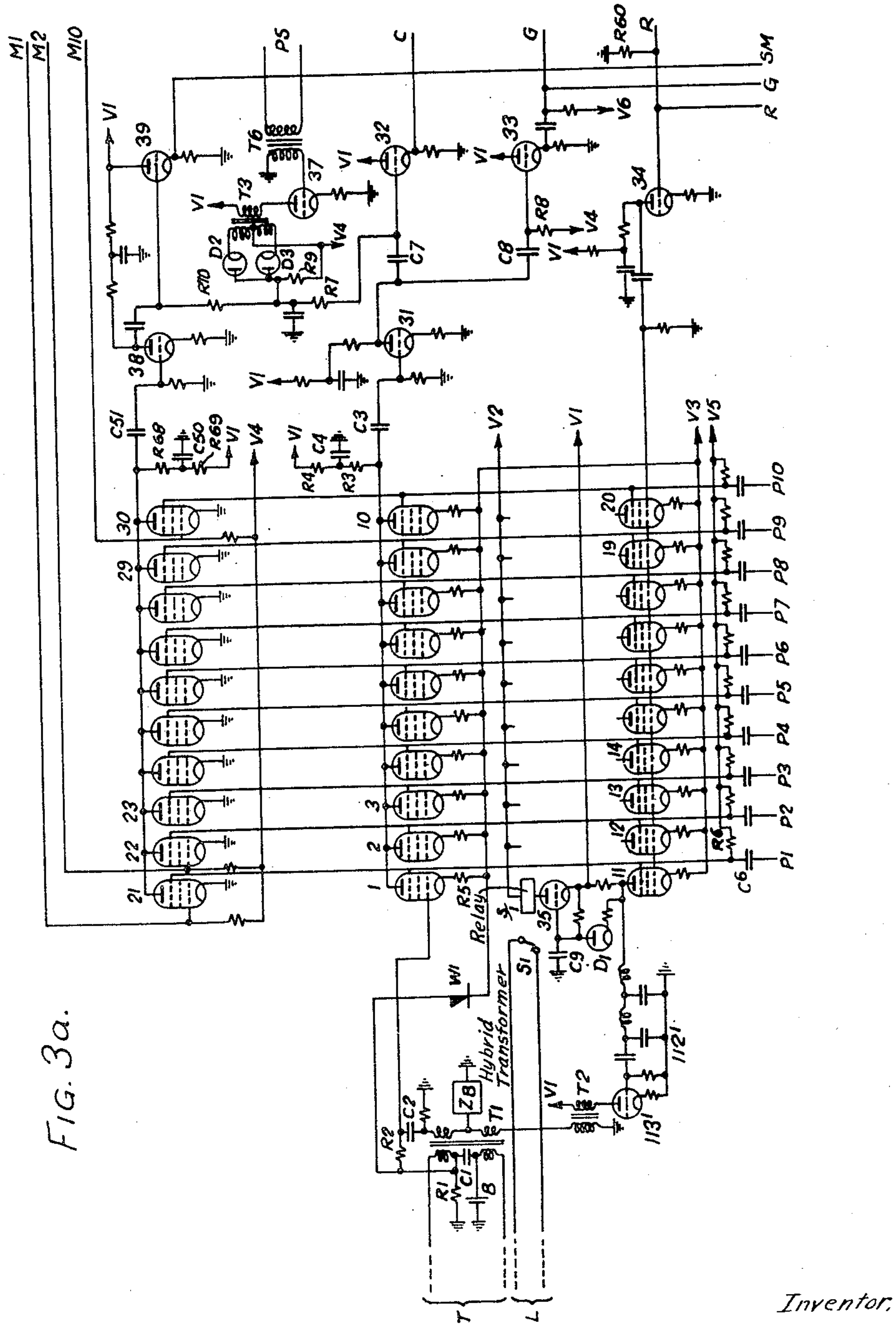
Figures 3B, 4:
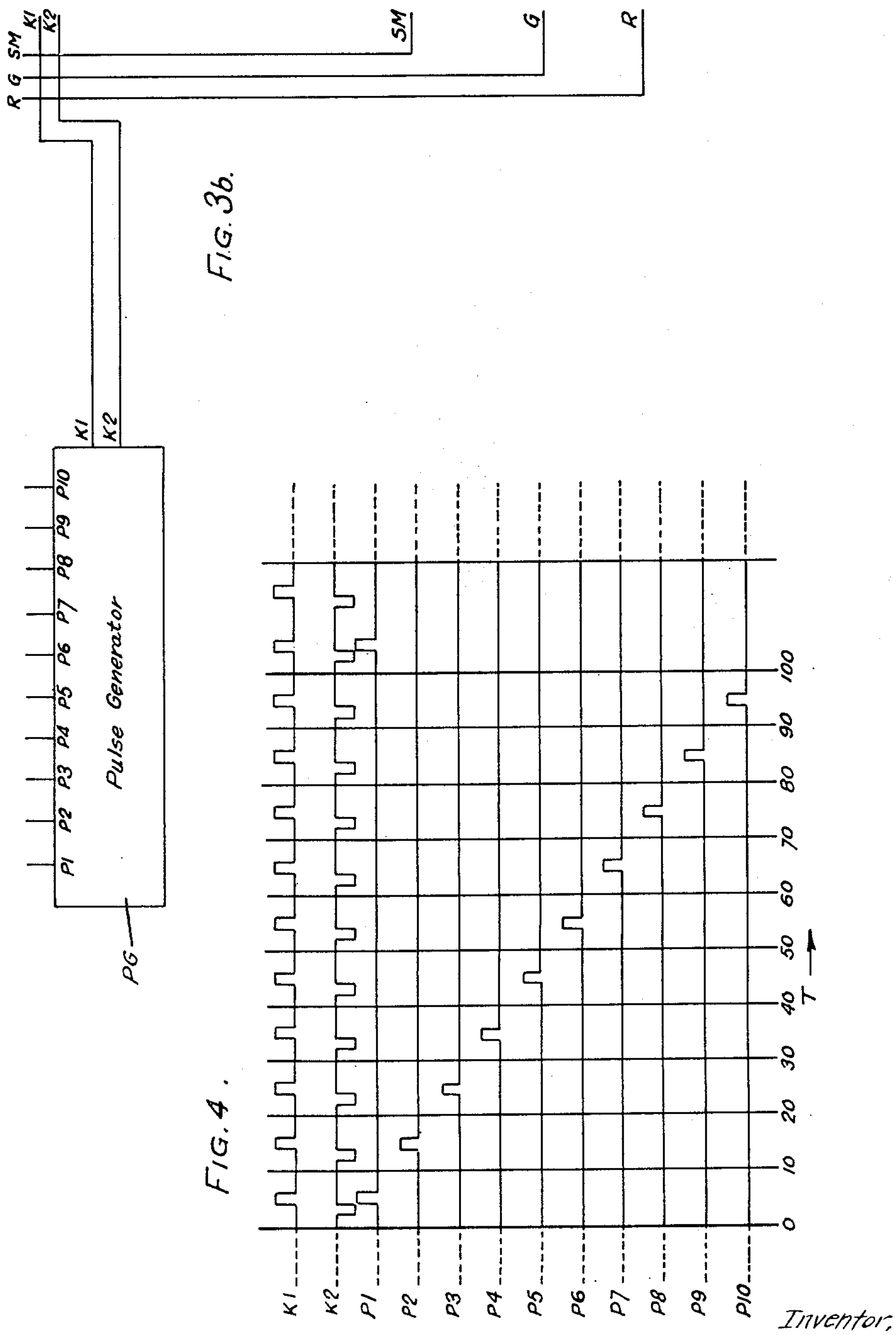

Figs. 3*a*, 3*b*, 3*c* and 3*d* together show an arrangement of an automatic telephone exchange embodying the invention and Fig. 4 is a timing diagram which illustrates the relation of pulses produced by the arrangement of Figs. 3*a* to 3*d*.

Referring to the accompanying drawings T11 and T11' represent respectively the transmit and receive 2-wire channels of a 4-wire circuit which is one of a plurality of 4-wire circuits which may be connected for example to subscribers' lines or to trunks connected by the circuits to trunks of a different switch. T12 and T12' represent the transmit and receive 2-wire channels of a second 4-wire circuit in the plurality of 4-wire circuits, the arrows indicating the direction of transmission in the case of each channel. When any one of the plurality of 4-wire circuits passes from the free to the engaged condition, that is, it "calls," the calling circuit is connected, as will be described, to a free 4-wire trunk in a plurality of 4-wire trunks of which one trunk having transmit and receive 2-wire channels T21 and T21' respectively is shown. The 2-wire transmit channels T11, T12 . . . are each connected to a time-division multiplex transmission system 100 which produces on a common signal circuit 101 time-spaced signal impulses corresponding in time order to the channels T11, T12 and so on. If it be assumed that there are one hundred channels such as T11, that the time-division multiplex system 100 provides one hundred channels which are allocated one for each of the 2-wire transmit channels T11, T12 . . . , that the pulse repetition frequency on each multiplex channel is 10,000 per second, then the impulses appearing on the common signal circuit 101 will be spaced at 1 microsecond intervals. In the example now being described it is arranged that when a 2-wire transmit channel is engaged, the corresponding impulses emitted from the multiplex system 100 will have a finite mean amplitude, speech currents being transmitted by modulation of the impulses but when the transmit circuit is idle the impulses will fall to zero or substantially zero amplitude. The 2-wire receive channels are each connected to a one hundred channel time-division multiplex transmission system 200 which distributes time spaced signals on a common signal circuit 201 in time order to the channels T11', T12', . . . via low pass filters 112', 122' . . . which demodulate the impulses to audio-frequency outputs which are amplified by the amplifiers 113', 123', . . . before being passed over the channels T11', T12' . . . .

The time spacing control means of the multiplex systems 100 and 200 are locked together such that the time element of system 100 corresponding to the 2-wire transmit channel of a 4-wire circuit is coincident with the time element of the system 200 corresponding to the 2-wire receive channel of the same 4-wire circuit. The common signal circuit 101 is commoned to a plurality of communication gate circuits of which one 102 is shown and of which there is provided one for each of the 2-wire transmit channels of 4-wire trunks which form a plurality of 4-wire trunks. Only one of these 2-wire transmit channels is shown and is designated T21. The corresponding 2-wire receive channel is shown as T21' and is connected via a communication gate circuit 202 to the common signal circuit 201. The communication gate circuits of other 2-wire receive channels of the 4-wire trunks are similarly connected to circuit 201. The communication gate circuit 102 is opened by and for the duration of an impulse over lead 103 and communication gate circuit 202 is opened by and for the duration of an impulse over lead 203. Leads 103 and 203 are both connected to lead 301 over which, as will be described, are passed impulses coincident with the channel impulses of any one of the circuits of the plurality of 4-wire circuits to which connection is required.

The input to a 2-wire channel e. g. T11 in the transmit direction and to T21' in the receive direction comprises a D. C. signal which is amplitude modulated by A. C. speech and other signals. In the absence of an input the corresponding channel impulses in the multiplex are of substantially zero amplitude. The D. C. component of an input causes the channel impulses to assume a standard amplitude said channel impulses being modulated by the A. C. component of the input. Demodulation of the channel impulses in the transmit direction by the low-pass filter 400 produces a modulated D. C. signal which is a replica of the input except that it is greatly attenuated. The amplifier 500 could amplify both the D. C. and the A. C. components but in practice this is undesirable. The amplifier 500 therefore amplifies the A. C. component which it delivers to the transmit channel T21. The apparatus marked 802 demodulates the channel impulses and amplifies the D. C. component, the D. C. and A. C. outputs being recombined at the transmit channel T21. In the reverse direction of transmission the same arrangement is used to demodulate and amplify the channel impulses from the multiplex 200, the low-pass filters 112', 122' . . . and amplifiers 113', 123' . . . handling the A. C. components and the apparatus 111', 121' . . . the D. C. components.

A line finder one of which is provided for each 4-wire trunk in the plurality of 4-wire trunks comprises a trigger circuit 300 which is, per se, of the well-known type which has two positions of electrical stability. This trigger circuit is set to one or other of its two positions of stability by impulses. The circuit 300 is set from its first to its second position by an impulse over the leads 302 or 303. It is set from its second to its first position by an impulse over the lead 310. This lead 310 is connected to a source K2 of impulses which are spaced one microsecond apart and timed a fraction, for example one-fifth, of a microsecond in advance of the channel impulses at the common signal circuit 101. The trigger circuit 300 while set in its second position causes and impulse, preferably of A. C. at, for example, 15 megacycles per second, to be emitted over lead 304 to an electrical or supersonic delay line 305 from which the impulse will emerge, in the example now described, after a time-delay of 99.6 microseconds, plus or minus a tolerance of, for example, one-fifth of a microsecond. The impulse from the delay line is passed to a synchronising gate circuit 307 over lead 306. Connected to the gate circuit 307 over lead 308 is a source of impulses K1 each of duration, for example, one-fifth microsecond, spaced one microsecond apart and substantially coincident with the channel impulses.

An impulse K1 will occur approximately at the time centre of an impulse received over lead 306 and, during the K1 impulse an impulse is emitted over lead 303 to set the trigger circuit 300 from its first to its second position and thus to initiate a further impulse from said trigger circuit over lead 304 as already described. The process is thus repeated by which the trigger circuit 300 is changed from one of its positions to the other. The trigger circuit 300, delay line 305 and gate circuit 307 together with their associated circuits are thus a circulating system which when once started produces an impulse over lead 301 every one hundred microseconds to operate on the communication gate circuits 102 and 202. The K1 impulses over lead 308 are synchronised with the multiplex system 100 and 200 so that the gate circuits 102 and 202 are opened as described at times coinciding with the appearance of the channel impulses of one 4-wire circuit in each of the multiplex systems. The impulses passed through gate circuit 102 are passed through the low-pass filter 400 for demodulation to audio frequency which is amplified by amplifier 500 and passed to transmit channel T21 as already described. Audio frequency currents incoming on receive channel T21' are modulated to channel impulses by the communication gate circuit 202 which is opened by the impulses appearing over lead 203 and the modulated channel impulses are commoned with the modulated channel impulses from other engaged trunks to the common signal circuit 201. It will thus be apparent that any 4-wire circuit, for example T11, T11' in the plurality of 4-wire circuits, can be electrically connected to any one of the 4-wire trunks, for example T21, T21' in the plurality of 4-wire trunks provided that the circulating system associated with said any one 4-wire trunk as described is arranged to emit over lead 301 impulses corresponding in time with the channel impulses of any selected one of the 4-wire circuits connected to the multiplex systems 100 and 200.

When no circuit in the plurality of circuits is engaged, all impulses over lead 101 will then have zero amplitude. If, now, one of the circuits for example T11, T11' . . . becomes engaged that is, it calls, impulses will appear over the common signal circuit 101 in time position relation which corresponds to the calling circuit. It has already been stated that the duration and spacing of the impulses have prescribed dimensions and it will be appreciated that the time between the channel impulses which correspond to one circuit is occupied by channel impulses which correspond to the various other circuits so that, if more than one circuit is engaged at a time, a number of channel pulses will appear simultaneously on the common signal circuit 101, these pulses being formed by the impulses which have been described and which appear one after the other on the common signal circuit. For the purpose of this explanation only one pulse is being considered that is, the pulse which appears when one of the circuits for example T11, T11' . . . calls. The common signal circuit 101 is connected over lead 110 to a gate circuit 700 which is normally open to allow impulses over lead 110 to pass over lead 701 and thence via leads 602 to pulse injection gate circuits 600 of which there is one to every trunk such as T21, T21'. Gate circuit 700 is closed by impulses which are received over lead 702, these impulses being supplied to the lead 702 over the delay lines 305 which are individually associated with the trunks such as T21, T21' . . . . Gate circuit 600 allows impulses received over the common lead 701 and lead 602 to pass to the trigger circuit 300 over lead 302 only when a marking signal from a trunk marker is applied to the gate circuit 600 over lead 601. The trunk marker is adapted, by means not shown, to mark only one gate circuit 600 at a time and that only a gate circuit which is associated with a free trunk in the plurality of 4-wire trunks. An impulse of the pulse which appears over the common signal circuit 101 when one of the circuits for example T11, T11' calls passes over lead 110, through gate circuit 700 which is open at this time, through a gate circuit 600 marked by the trunk marker, over lead 302 and thus sets trigger circuit 300 from its first to its second position, thus starting the circulating system as described above. The next and subsequent impulses to appear over common signal circuit 101 from the calling circuit coincide with the impulses emitted over lead 301 and thus for the duration of the impulses the engaged circuit is electrically connected to the marked trunk. The said next and subsequent impulses will be prevented from passing gate 700 which is thus termed a common pulse supression gate by the impulses which appear coincidentally with them over lead 702 from lead 309 and thus cannot cause another circulating system to start generating impulses. When the connection has been established as described the D. C. component of demodulation obtained from the demodulating apparatus 802 is passed over lead 803 to the trunk marker to indicate that the marked trunk and its line finder has been taken into service. The trunk marker then marks another free trunk which will connect itself as just described to the next circuit of the plurality of circuits to call. As the removal of the marking over lead 601 is relatively slow, should two circuits call and start their channel pulses within a very short interval of time there would be a danger of the two calling circuits becoming connected to the same trunk. For this reason the impulses emitted from the trigger circuit 300 are passed over lead 900 to an integrating circuit 901 which converts the impulses into a continuous signal which is applied over lead 902 to the gate 600 so as to close this gate as long as the signal persists and this continuous signal is applied in advance of the removal of the marking of the trunk marker.

When a calling circuit is released, the corresponding pulse on the common signal circuit 101 becomes zero and therefore the output impulses from gate 102 and the output from the apparatus 802 also becomes zero. A lead from the demodulating apparatus 802 is connected to an impulse generator 800 which is adapted to produce a long impulse over lead 801 when the impulses from gate 102 and the output from apparatus 802 cease. The impulse over lead 801 holds the trigger circuit 300 in its first position despite an impulse which appears over lead 303 and which, in the absence of the impulse over lead 801, would set the trigger circuit 300 in its second position. The circulating system is thus interrupted and the connection between circuit and trunk is broken.

Figure 1:
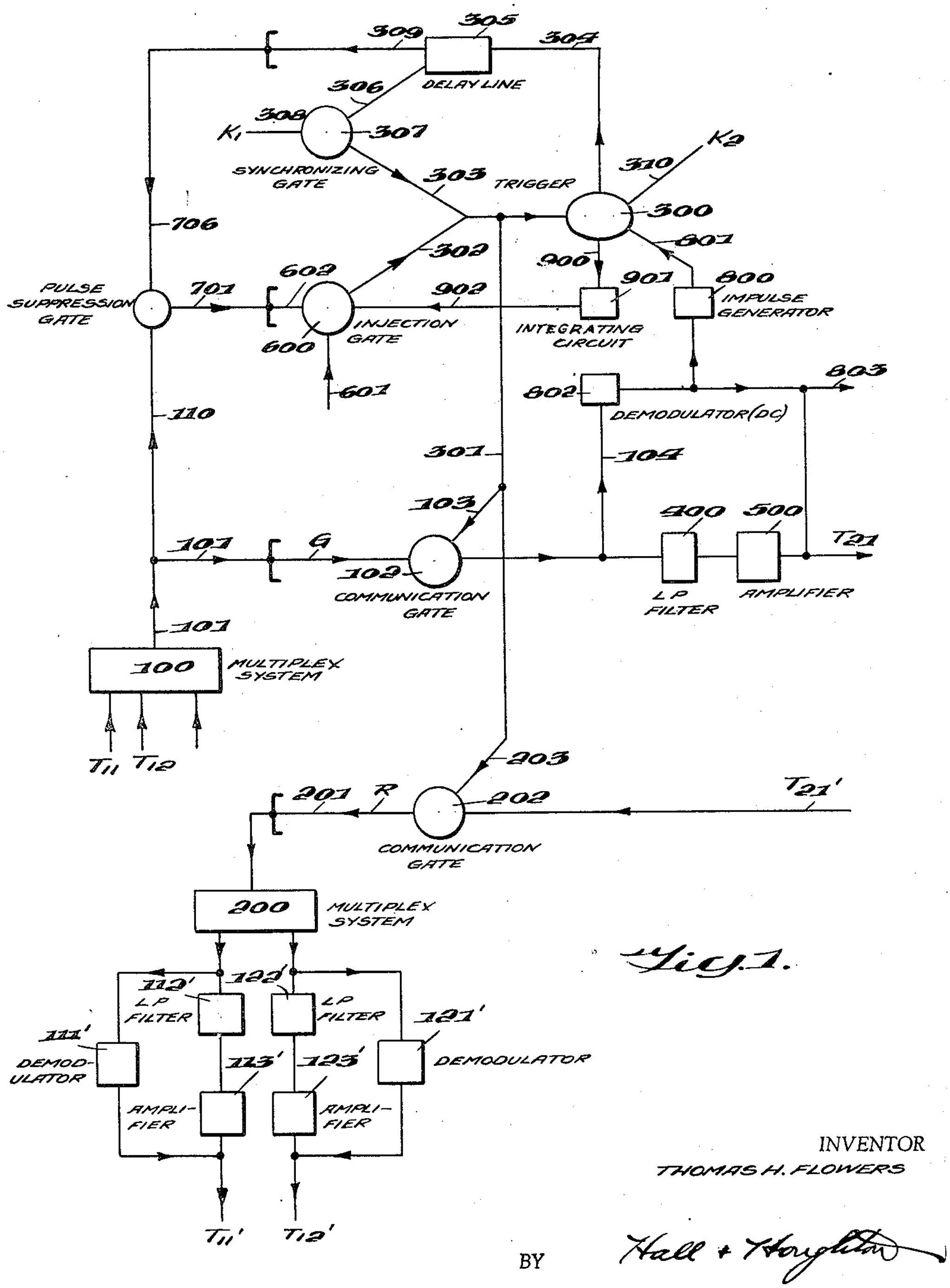
Fig. 1 is a schematic diagram illustrating an arrangement which embodies pulse selector means according to the invention for connecting a plurality of circuits via a common signal circuit with a plurality of trunks by the method known as line finding e. g. the selection of a calling circuit from among a plurality of circuits. This arrangement will be called a line finder.
Figure 2:
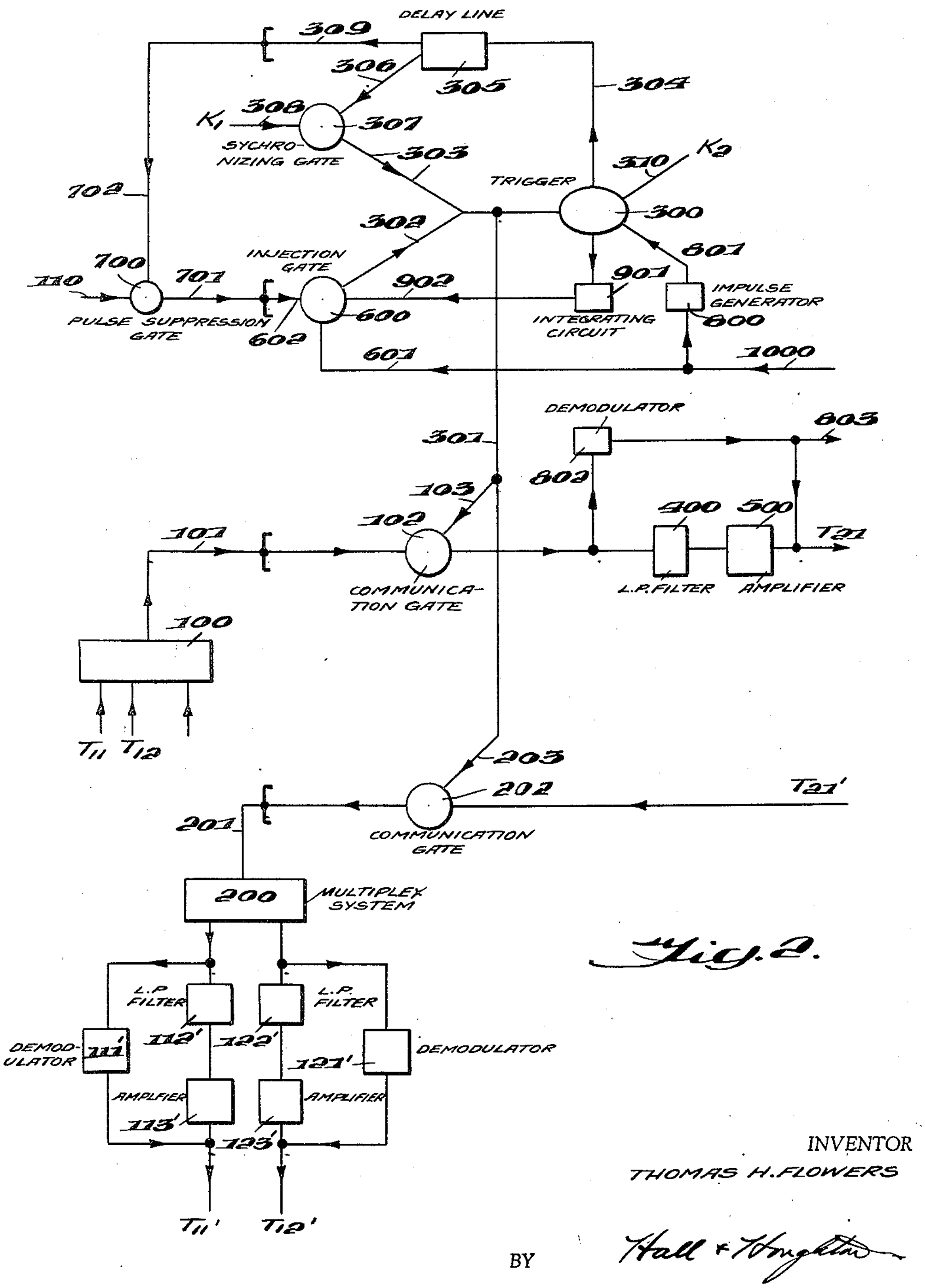
Fig. 2 is a schematic diagram illustrating a further arrangement for connecting a plurality of circuits via a common signal circuit with a plurality of trunks by the method known as selecting e. g. the selection of a non-calling or quiescent circuit from among a plurality of circuits. This arrangement will be called a selector.

The arrangement shown in Fig. 2 differs from that shown in Fig. 1 in that the lead 110 is not connected to lead 101 but to a line marker, and the device 800 is not connected to the apparatus 802 but to a controlling lead 1000 to which lead 601 is also connected instead of to a trunk marker. The arrangement of Fig. 2 functions to connect a 4-wire trunk T21, T21' which has been marked by a signal over lead 1000 from a previous switching stage to the selected circuit such as, for example, the circuit T11, T11'. A line marker, not shown, is caused to emit a pulse over lead 110 coincident with the channel pulse corresponding to the circuit T11, T11' and thus to start the circulating system associated with trunk T21, T21' at the appropriate time. The desired connection is thus established and is broken down when the signal on lead 1000 is removed.

Referring to Figs. 3*a*, 3*b*, 3*c*, 3*d*, and 4, Figs. 3*a* to 3*d* show the circuit arrangement of a simple ten-line automatic telephone exchange which would be suitable for a private exchange serving subscribers located close together for example in the same building.

A subscriber's exchange equipment is shown as consisting of the lines T and L together with the apparatus shown between these lines and the valves 1 and 11 on Fig. 3*a*. A second subscriber's line is similarly arranged and connected to the valves 2 and 12 but has been omitted from the drawing. The valves 3 and 13, 4 and 14 . . . 10 and 20 are also connected to subscribers through similar apparatus. At each subscriber's station is a conventional handset consisting of a carbon granule type transmitter and electromagnetic receiver, a switch hook to give the D. C. calling and clearing conditions and an impulsing dial, all connected to a pair or circuit T. In addition each subscriber is provided with a signalling device, not shown, for example a lamp and battery connected to the pair L.

The valves 1 to 10 are arranged to form pulse modulators and serve, with the associated apparatus to be described as a multiplexing device to convert, in a time division multiplex process, the transmitted D. C. and audio frequency signals which appear on the pairs T into amplitude modulated time-spaced signals on a common signal circuit, i. e. the common anode circuit of the valves 1 to 10. After polarity inversion by a valve 31 and power amplification by a cathode follower valve 33 the time-spaced signals are transmitted over the lead G to a plurality of first selectors or, as they will be termed henceforth herein, line finders, the circuit of one of these line finders being shown in Fig. 3*c*.

Figure 3C:
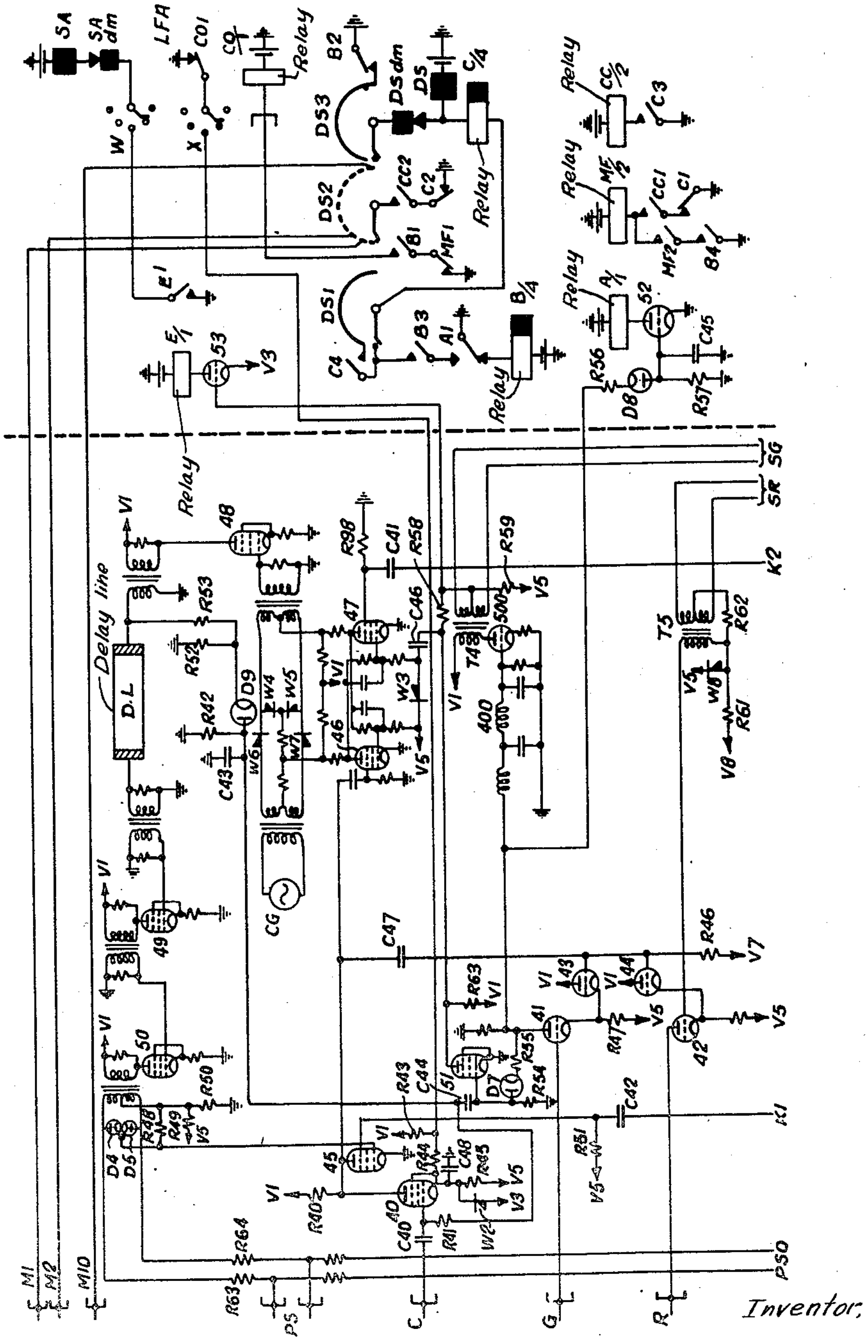
Figure 3D:
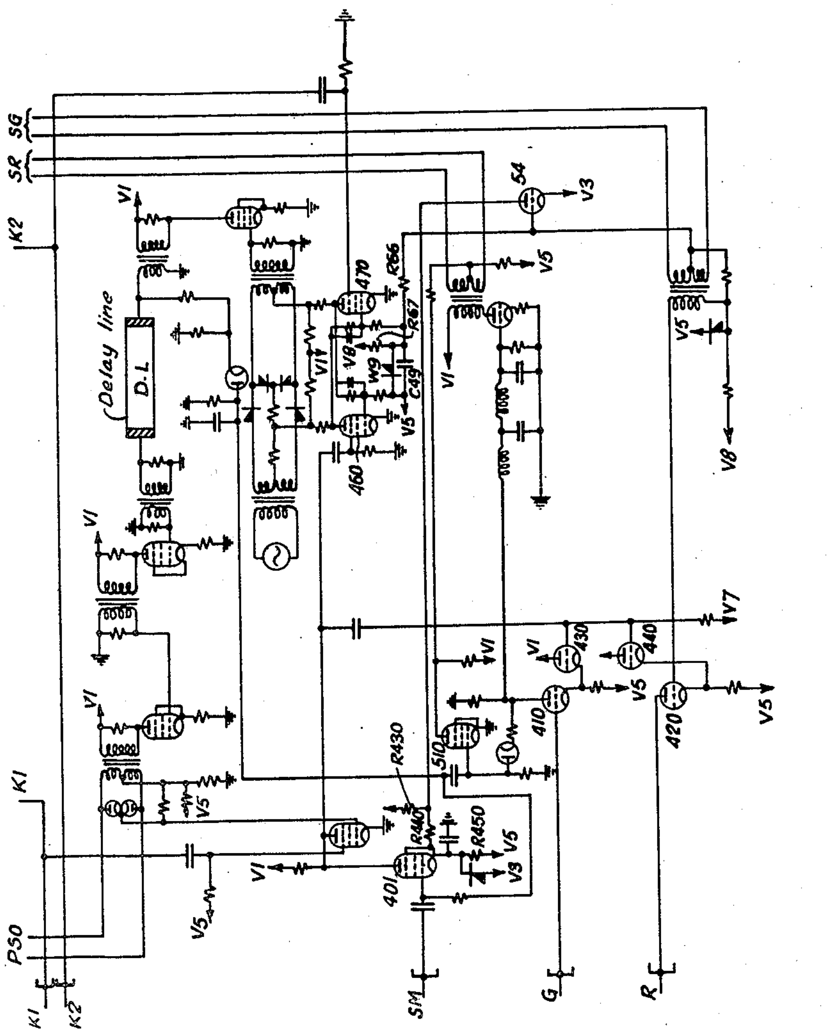

Each line finder as shown in Fig. 3*c*, is trunked direct to a selector, there thus being a number of selectors and the circuit diagram of such a selector is shown in Fig. 3*d*.

Valves 11 to 20, shown in Fig. 3*a*, provide the means whereby the received speech or signals which appear on the common signal circuit R as amplitude modulated time-spaced signals, are distributed to the exchange circuits of the subscribers.

Each line finder is associated with in addition to means enabling it to connect to a calling subscriber by line finder action, apparatus arranged to respond to the dialled number of the wanted subscriber and, also to complete the connection.

The marking of a disengaged line finder, and thus the marking of a free trunk, is performed by a trunk marker LFA, the circuit of which is shown in Fig. 3*c* to the right of the broken vertical line.

Both the line finders and the selectors are connected to the common signal circuits G and R via gate valves such as valves 41 and 42 shown in Fig. 3*c*.

As has already been described information from a calling circuit, the subscriber's circuit in the arrangement now being described, is converted into a pulse which consists of regular time-spaced impulses. The interval between the time centres of adjacent impulses of one of these pulses may be called the multiplex period the reciprocal of the period being the pulse repetition frequency and the available time during which an impulse may persist is called the channel spacing, the term channel referring to a path through a multiplexing device. The pulse repetition frequency must exceed twice the highest audio frequency used to modulate the impulses in order to obtain satisfactory transmission.

In the accompanying drawings the screen grids of pentode valves are shown disconnected and it is to be understood that the leads to these grids have been omitted to avoid confusion and that they are to be connected in the normal manner to a source of potential which is suitable for the operating conditions and characteristics of the valves.

As stated above ten circuits are provided in the exchange shown in the drawings. The multiplex pulse repetition frequency employed is 10,000 cycles per second so that each circuit may theoretically be connected to the common signal circuits for a channel period of ten microseconds during each multiplex period of 100 microseconds. In practice, however, due to the necessity for ensuring that each circuit is disconnected before the next is connected to the common signal circuit, and due to the limiting speeds at which the switching operations can be carried out, it is advantageous to arrange that each circuit is connected to the common signal circuits for only a fraction of the channel spacing. A suitable fraction is one fifth and in the following description it is assumed that the duration of a channel impulse corresponding to one circuit is 2 microseconds.

The valves 1 and 11, 2 and 12, etc. are switched off, i. e. made non-conducting over their anodes, by a bias voltage V5 which is applied via resistors such as R6 to the suppressor grids of the valves. The voltage V5 is sufficiently negative with respect to the cathode supply voltage V3 to cut off anode current. The valves may be switched on by, and for the duration of, positive-going impulses of a magnitude substantially equal to the difference between the voltages V3 and V5 applied to the suppressor grids via condensers such as C6.

The positive-going impulses applied to the condensers such as C6 are obtained from a pulse generator PG. This generator may be designed in accordance with well-known practice and any suitable arrangement may be employed. The generator is required to generate pulses on twelve output leads marked K1, K2, P1, P2 . . . P10. The pulses generated are illustrated by the timing diagram of Fig. 4. The lead K1 carries a continuous pulse which will be called the K1 pulse, which consists of positive-going impulses of substantially rectangular form each enduring for two microseconds and occurring with a repetition frequency of 100,000 cycles per second. This K1 pulse is the primary timing means of the system and may be obtained by the well known method of squaring the sinusoidal output of a 100,000 cycles per second oscillator and then differentiating and re-squaring to obtain the desired asymmetrical waveform. The head K2 is supplied with the K2 pulse which consists of negative-going impulses of the same form, duration and repetition frequency as the K1 pulse but arranged to occur approximately eight microseconds later. It may be obtained by using the same source of sinusoidal waves as is used for the K1 pulse, said waves being passed through a suitable phase shifting network before being subjected to the process of squaring, differentiating, re-squaring and polarity inversion necessary to produce the required waveform. The lead P1 is supplied with the P1 pulse which may be obtained by gating every tenth K1 impulse to the P1 lead. This may be done by using a source of sine waves of frequency 10,000 cycles per second synchronised with the 100,000 cycles per second oscillator and suitably phased, squared, differentiated, and re-squared to enable it to operate on a gate-amplifier situated between the K1 lead and the P1 lead. Such a gate-amplifier may be a pentode valve arranged in known manner to conduct only at the desired times. Another method of producing the P1 pulse may consist in employing a conventional electronic bi-quinary counter served at the input with the K1 pulse and emitting at its output a square wave which after differentiation may be employed to operate on a gate-amplifier situated between the K1 lead and the P1 lead. The individual impulses on the P1 lead are thus synchronous with, and are of similar polarity, duration and form as one and every tenth K1 impulse. The lead P2 is supplied with the P2 pulse which is similar in all respects to the P1 pulse except that the P2 impulses are delayed ten microseconds with respect to the P1 impulses. The P2 pulse may be generated as in the first method suggested for the P1 pulse but with a suitable phase shift circuit inserted in the 10,000 cycles per second drive circuit. Similarly the P3—P10 pulses are supplied on the appropriate leads, each being derived in time relation to the lower numbered pulse as suggested above for deriving the P2 pulse in relation to the P1 pulse.

As shown in Fig. 3*a*, the anodes of valves 1 to 10 are connected to a common anode resistor R3. Resistor R4 and condenser C4 are provided for de-coupling the supply potential V1 which is suitably positive with respect to V3.

When subscribers are disengaged their circuits T are open circuited and under these conditions the control grids of valves 1 to 11 are at earth potential. The cathodes of these valves are connected via resistors such as R5 to a supply potential V3, positive with respect to earth such that all the valves are cut off at their control grids. Thus, in spite of the impulses which are applied from generator PG to the suppressor grids of the valves, no impulses are emitted into the common anode circuit when the channels are disengaged. Should a subscriber now engage his line, direct current flows from the positive terminal of the exchange battery B via one half of the primary winding of the hybrid transformer T1, one leg of the pair T through the subscriber's transmitter, dial and switch-hook contacts, back along the other leg of the pair T and the other half of the primary winding of transformer T1, through the resistor R to the earthed terminal of the exchange battery. An effect of the feeding current thus drawn is to raise the potential of the junction of R1 and the primary winding of transformer T1 from that of earth to the value at which the rectifier element W1 conducts and so arrests the potential rise at a value very slightly positive with respect to the D. C. supply voltage V3. This rise in potential is communicated via the resistor R2 to the control grid of the valve 1, and such is the value chosen for the cathode resistor R5 that in this condition the valve 1 operates satisfactorily as an amplifier. Similarly are the valves 2 to 10 controlled by the act of engaging the lines associated with them. When, therefore, any subscriber engages his line, a negative-going channel pulse is developed across the common anode resistor R3. This channel pulse is developed by and is therefore synchronous with the P1 to P10 pulse applied to the suppressor grid of the particular valve 1 to 10 associated with that subscriber. This feature of the invention constitutes the calling and holding signal from a calling subscriber and, as will be seen, the answering signal from a called subscriber.

In like manner when other subscribers engage their lines they too cause channel pulses to be developed, across resistor R3, which, apart from polarity and amplitude are replicas of the P1 to P10 pulses which have been allocated to them.

When a subscriber disengages his line, the potential at the control grid of the associated valve 1 to 10 reduces to earth potential thus cutting off the valve and removing the associated channel pulse from among those, if any, appearing across the resistor R3. This feature constitutes the clearing signal.

The amplitude of any particular channel pulse is dependent on the potential of the control grid of the associated valve 1 to 10. In the absence of any potential across the resistor R2, the channel pulse will have a steady amplitude which will be referred to as the standard amplitude. Speech or signals, incoming on the pair T and developing alternating currents in the primary windings or transformer T1, will produce an alternating potential in the secondary windings of T1. A part of this potential is, via condenser C2, developed across the resistor R2 and so will amplitude modulate the channel impulses emitted from the anode of the associated valve 1 to 10. This is the means by which speech or A. C. signals are transmitted through the multiplex.

Dialling impulses are transmitted in the same way as the calling and clearing signals, namely each time a subscriber's line is open circuited the impulses of the associated channel pulse reduces to zero amplitude and when the line is reclosed the impulses re-commence. As will be seen, timing circuit means are provided on the selector for differentiating between dialling and clearing signals.

Channel impulses appearing across R3 are polarity inverted by the amplifier 31 and then communicated via condensers C7 and C8 to the control grids of the cathode followers 32 and 33. Valves 32 and 33 have their anodes connected to the supply potential V1 and their cathodes connected through cathode resistors to earth. The control grid of valve 32 is biased, via resistors R7 and R9, to the D. C. supply potential V4 and the control grid of valve 33 biassed via R8 to the same voltage V4, which is made negative with respect to earth by an amount sufficient to hold valves 32 and 33 close to the cut-off point thereby enabling them to handle satisfactorily the positive-going channel impulses. The cathode follower 32 applies the impulses to the lead C, and the cathode follower similarly serves the lead G.

So far only the transmission of speech and signals incoming from the subscriber has been considered, and it has been explained that such speech and signals appear on the common signal circuit G in the form of amplitude modulations superimposed on the standard amplitude of the channel impulses. Speech or signals transmitted to the subscriber appear on the common signal circuit R as amplitude modulations superimposed on channel impulses of standard amplitude. As will be seen, these impulses are formed and modulated in the line finder or selector to which the subscriber is connected and are synchronous with the channel impulses on the common signal circuit G. Appearing on the common signal circuit R as negative-going impulses, these impulses are polarity inverted by the amplifier 34 and communicated to the common control grids of the valves 11 to 20. These valves have their cathodes connected, each through a cathode resistor, to the supply voltage V3, and the control grids through a common grid leak to earth, the cathode resistor being so chosen with regard to the valve characteristics, the voltage V3 and the standard amplitude of the positive-going channel impulses that each channel impulse raises the potential of the control grids into the operating range of potential within which the valves amplify satisfactorily. Valves 11 to 20 have the suppressor grids connected to those of valves 1 to 10 respectively and are therefore subject to the same operation of being cyclically switched on for the duration of the impulses supplied over leads P1 to P10 Since, as has been said, the appearances on the common signal circuits G and R of any particular channel impulse are synchronous it follows that the channel impulse on the common signal circuit R will be gated through the appropriate valve 11 to 20 and not through any other. As will be described later the channel impulse on th common signal circuit R does not appear until the called subscriber answers. When this occurs, negative-going channel impulses appear at the anode of the relevant valve of valves 11 to 20 and the condenser C9 and control grid of the valve 35 rapidly becomes charged negatively via the diode D1 sufficiently to cut off valve 35 and release the normally operated relay S, which via contacts S1, completes the circuit between the legs of pair L. This is the answering signal already mentioned.

The anodes of valves 11 to 20 are also each connected to a low-pass filter 112′ having a cut-off frequency slightly less than 5,000 C. P. S. Speech or voice-frequency signals existing as a modulation on the channel pulses pass the filter and are then amplified by valve 113′ and transmitted via transformers T2 and T1 to the subscriber's line. The purpose of the amplifier 113 is to make good the losses due, amongst other things, to multiplexing. The loss due to multiplexing a ten channel system, using rectangular pulses of only one fifth of the channel period is 2499/2500 of the input power.

The arrangement of the windings of transformer T1 will be clearly understood by those accustomed to telephone practice. Condenser C1 is made large enough to provide negligible impedance to voice frequencies compared with that offered by the primary windings of T1, and $Z_B$ is a balancing network. It should be understood that the system has obvious inherent possibilities of amplification which, although requiring an accurate balance impedance, $Z_B$, open up possibilities of longer, or cheaper, local lines.

A number of line-finders, equal to the number of simultaneous conversations required and arranged as shown in Fig. 3c is provided. The common leads to which all line finders are directly joined are as shown on the left-hand side of the diagram. On the top right hand side of the broken line of Fig. 3c is shown the circuit of the trunk marker LFA, this comprising a self-drive uniselector SA of well known type. The uniselector SA possesses two wipers each working over a set of contacts. One wiper is arranged to be connected to earth and the other via the driving magnet, SA, and associated mechanically operated interrupter contacts, SA d.m., to the exchange battery. The trunk marker LFA is joined to each line-finder by two leads, such as W and X, which are wired to corresponding contacts in the two banks. The trunk marker is so adjusted that if the W lead to the bank contact on which the uniselector SA is standing becomes earthed the wipers will automatically step on until such a contact is found free from earth.

Lead W is connected to make contact E1 of the relay E, the other side of the contact being earthed. As will be seen, while a selector is engaged relay E is operated thus preventing the uniselector SA from remaining on the relevant W contact. In consequence the trunk marker wipers will always be found standing on the X and W contacts of a disengaged line-finder, assuming there to be such a line finder. In this condition the trunk marker is said to mark that line finder to take the next call, a function performed by extending earth potential over lead X to the resistors R43 and R44 in the line finder. When this line finder later becomes engaged, the wipers step on to mark another disengaged line finder.

In Fig. 3c valves 41 and 43, and 42 and 44 are the communication gates by means of which line finders are connected to the common signal circuit G and R respectively i. e. are the gates 102 and 202 of Fig. 1. When a line finder is disengaged these gates remain closed, that is to say, the valves 41 and 42 are rendered inoperative. When a line finder becomes engaged these valves are cyclically rendered operative coincidently with the appearance on the common signal circuit G of the engaging channel pulse. The timing device preferred for cyclically operating the communication gates comprises a circulation system into which a single impulse, of the channel pulse it is desired to select, may be injected and which contains a delay device having a delay approximately equal to the multiplex period. The circulation system is so arranged that once started, impulses will circulate until deliberately stopped, and at each occasion of passing the injection point in the system will effect the required operation of the communication gates.

The delay device employed in the circuit of Fig. 3c is a mercury filled, supersonic delay line DL of the type now familiar to workers in many fields and particularly to those engaged on computer systems. Some devices are described in an article entitled "An Ultrasonic Memory Unit for the 'E. D. S. A. C.'" by M. V. Wilkes and W. Renwick which appeared in the periodical "Electronic Engineering" vol. 20, No. 245, July 1948, and in an article entitled "Mercury Delay Lines" by T. K. Sharpless which appeared in the periodical "Electronics" dated November 1947, at page 134.

It will be appreciated by those skilled in the art that practical difficulties arise when attempts are made to construct a multiplicity of timing units, such as the mercury filled delay line, each so stable with respect to the master timing device, namely the KI pulse, that when started said units will remain accurately synchronous with the KI pulse for a long period. It is possible, however, and means will be described to overcome these difficulties by employing a source of synchronising pulses and using these to re-phase the circulating pulse each time it reaches the injection point and so by preventing the cumulative effect of the drift in the delay line, limit the error to that of a single transmission through the line. In this condition, the delay stability of the mercury delay line is adequate for the purpose required.

Valves 40 and 45 of Fig. 3*c* are the impulse injection and synchronising gates respectively. A negative-going impulse emitted from the common anode circuit of these valves is arranged to be communicated to the suppressor grid of the normally conducting valve 46 thus changing over the trigger valves 46 and 47 from the first position of stability to the second. The anode circuits of the trigger valves 46 and 47 are connected to a balanced static relay comprising the rectifying elements W4, W5, W6 and W7 and associated transformers and resistors in such a manner that when the trigger is in the first position of stability the attenuation between a carrier frequency oscillator CG and an amplifier valve 48 is very great and when the trigger is in the second position of stability said attenuation is rendered small. In consequence, therefore, of changing over the trigger, carrier frequency is admitted to the amplifier 48 until the trigger is changed back. This occurs 8 micro-seconds later by virtue of the incidence at the suppressor grid of valve 47 of the negative-going K2 pulse developed across the resistor R98 and supplied via condenser C41 from the pulse generator PG. The 8 micro-seconds impulse of carrier frequency is amplified at valve 48 and transmitted through the output transformer of that valve to the transmitting quartz plate of the delay line DL. The delay line is constructed to have a delay of ninety-six micro-seconds and, at the end of this time, the impulse of carrier frequency emerges, greatly attenuated, from the receiving quartz plate. After passage through the delay line, the impulse is amplified by valves 49 and 50 and a part of the power rectified at diodes D4 and D5, to produce a positive-going impulse across the resistor R48 sufficient to raise the control grid of valve 45 from cut-off potential to which it is biassed through the potentiometer R49 and R50, connected between earth and negative potential V5, to substantially earth potential. Valve 45 has the cathode earthed and the suppressor grid pulsed continuously through condenser C42 by KI pulses of amplitude substantially equal to the cut-off bias voltage V5 which is applied to the suppressor grid of valve 45 via R51. Since the delay in the supersonic line DL is 96 micro-seconds it follows that valve 45 will be switched on at the control grid before the leading edge of an individual KI impulse occurs at the suppressor grid, and switched off again at the control grid after the said leading edge. A single KI impulse is therefore gated into the anode circuit of valve 45 and develops a negative-going impulse across resistor R40 exactly one hundred micro-seconds after the previous impulse across the resistor. Thus trigger valves 46 and 47 are again changed over and then restored by a K2 impulse and the process continuing as above, it will be seen that circulation having been started will continue until deliberately interrupted provided the delay of the delay line remains within the range 92–100 micro-seconds.

The negative-going pulse which is thus developed on the common anode resistor R40, being developed in the first instance by a channel impulse applied to the control grid of valve 40 and subsequently by impulses gated through valve 45 from the KI pulse at the suppressor of valve 45 is necessarily synchronous with, and comprises impulses which endure for the same periods as the channel impulses which correspond to the particular subscriber who has engaged his line. This negative-going pulse is employed to open the communication gates in order to admit into the line finder the appropriate channel pulse on the common signal circuit G and to emit from the line finder a synchronous channel pulse into the common signal circuit R. The communication gates comprise the pairs of valves 41 and 43, 42 and 44. Valves 41 and 42 are amplifiers, valve 41 having a control grid circuit connected with the common signal circuit G and individual anode circuit while valve 42 has an individual control grid circuit and anode circuit connected to the common signal circuit R. In both cases the anode supply potential is earth, while the cathode supply potential V5 is negative with respect to earth. With no input signal and with valve 43 removed, the control grid of valve 41 is biased to cut-off by means of the potential V6, see Fig. 3*a*, and the cathode resistor R47 is so chosen that a positive-going channel pulse of standard amplitude will raise the potential on the control grid into the range of potentials within which valve 41 amplifies saitsfactorily. The control grid of valve 42 is also normally biased to cut off, the potential on the earth phantom of the return pair being, under these conditions, such in conjunction with the potential V8 and the potentiometer R61 and R62 as to produce the necessary bias via the secondary winding of the transformer T5. When, as will be seen, the called subscriber answers, the potential of the earth phantom of pair SR is raised to a level sufficient to ensure that the rectifier W8 conducts and so clamps the bias of the control grid of valve 42 at the potential V5 in which condition valve 42 amplifies satisfactorily. In addition to the switching operations performed on valves 41 and 42 by the changes in control grid bias above described, both valves are normally rendered non-conducting by the cathode-biasing action of the valves 43 and 44. These valves have their anodes connected direct to the supply potential V1 and their control grids biased via resistor R46 and supply potential V7 which is positive with respect to V5. The cathodes of valves 43 and 44 are connected to the cathodes of valves 41 and 42 respectively. Such is the bias voltage V7 that, in the absence of any potential superimposed on it, the cathodes of valves 43 and 44 and therefore those of 41 and 42 are held so far positive with respect to V5 that valve 41 is maintained cut off even when there are incident at the control grid of that valve channel impulses of the maximum amplitude which may be expected. When, however, a line finder is engaged and is, therefore, developing across resistor R40 a negative going pulse synchronous with the channel pulse to be selected, each impulse of this negative-going pulse is superimposed, via condenser C47, on the bias applied to the control grids of valves 43 and 44, which valves are consequently cut off thereby enabling valves 41 and 42 to amplify during the duration of the impulse. These are the means according to the invention by which selection of a wanted channel is effected.

The selected channel pulse which is gated through valve 41 is then passed through a low-pass filter 400 and amplifier 500 of similar constructions to those 112′ and 113′ described in relation to the subscriber's exchange apparatus, and the voice frequencies so extracted are transmitted via the transformer T4 to the pair SG.

Another feature is the means by which pulse circulation is started in the line-finder. If reference is made to Fig. 3*a* it will be observed that channel impulses, after polarity inversion at valve 31, are served to the control grids of both cathode followers 32 and 33. The cathode follower 32 applies signals to the common calling pulse circuit, lead C, and it will be observed that although normally biased close to cut-off by potential V4 via resistors R9 and R7, at which bias valve 32 satisfactorily amplifies the channel pulse, the application of an impulse of alternating current to the pairs PS will, after said pulse has been amplified, at transformer T6 and valve 37, and rectified at transformer T3 and diodes D2 and D3, result in superimposing a negative-going impulse on the bias of valve 32. The amplitude of the negative-going impulse so obtained is sufficient to render valve 32 non-conducting even when served with a channel impulse of the maximum amplitude to be expected. The pair PS is common to all line finders, which communicate to it, via decoupling resistors such as R63 and R64 shown in Fig. 3*c*, a proportion of the power of the 8 micro-second pulse of carrier frequency which emerges from the amplifier following the mercury delay line. Thus is the gate valve 32 prevented from passing to the common calling pulse circuit C any channel pulse which is already in circulation in a line finder.

It will now be apparent that when any subscriber originates a call the channel pulse allocated to him will appear on the calling highway C until he becomes connected to a line finder when by virtue of the above described means the said channel pulse will be barred from the common calling pulse circuit. Referring again to Fig. 3*c* the common calling pulse circuit C is connected via condensers such as C40 to the control grids of valves such as valve 40 in each line finder. Valve 40 is the means by which an impulse appearing on the common calling pulse circuit may be injected into the circulation system of the line finder marked by the trunk marker LFA. As has been said, valve 40 has the anode connected via the anode resistor R40 to the supply potential V1, and the cathode to a tapping in the potentiometer comprising resistors R43, R44, and R45, said potentiometer being connected between the supply potentials V1 and V5. A second tapping in the potentiometer is connected to the contact X of the trunk marker the potentials V1 and V5 and the resistors of the potentiometer being so designed that when a first selector is not marked by the trunk marker the cathode of valve 40 is held at a potential so far positive with respect to the control grid that valve 40 is cut off so that it is not affected by the maximum amplitude of channel impulse which may appear via condenser C40 and when a line finder is marked by the trunk marker cathode of valve 40 is brought to a potential, relative to the control grid such that valve 40 is then at cut-off point and is thus enabled to respond to a positive-going impulse applied via condenser C40. This potential of the cathode of valve 40 in the marked condition is stabilized at the supply potential V3 by the rectifier element W2 which conducts when the potential of lead X is held at earth potential. The control grid of valve 40 is normally biased to earth potential via resistors R41 and R42, a condition, however, which is immediately modified after impulse injection into the line finder has taken place, for a proportion of the power of the pulse of carrier frequency transmitted to the mercury delay line DL obtained via the potentiometer R52 and R53 is rectified by diode D9 and, consequently, a negative going potential is rapidly developed across resistor R42 thus biasing back the control grid of valve 40 sufficiently to prevent the injection of a second channel in pulse, originated by a second calling subscriber, before the trunk marked LFA has moved on and so unmarked the selector. Resistor R42 is shunted by a condenser C43 which, in addition to providing smoothing for the rectifier D9, is made so large that the negative potential developed across R42 decays only by a small amount between successive impulses of carrier frequency thus maintaining valve 40 cut-off at the control grid whilst the line finder is held. This feature prevents injection into a line finder of impulses of more than one channel pulse.

The condenser C48 connected between the cathode of valve 40 and earth is provided to decouple the cathode resistance during the period of pulse injection.

Another feature of the arrangement consists in the transmission through the line finder of the calling and holding and clearing signals. When a line finder becomes connected to a calling subscriber as described above the negative-going potential developed across R42, in addition to closing the injection gate i. e. valve 40, is communicated to the control grid of the normally conducting valve 51 via condenser C44. The anode of valve 51 is connected to the supply potential V1 via resistor R63, the control grid of this valve to earth via resistor R54 and the cathode directly to earth. The negative-going potential communicated via condenser C44 is sufficient to cut-off valve 51 and, such is the time constant at the control grid of valve 51, the negative potential there decays but slowly and is in fact arrested in its decay by the action of the channel pulse gated through valve 41 continually discharging the condenser C44 via the diode D7 and resistor R55. Resistor R55 is provided to limit the current drawn by the diode D7 to a value insufficient to cause appreciable distortion to the channel pulse gated through valve 41. Valve 51 is therefore rapidly rendered non-conducting when the selector becomes engaged and is maintained in that condition by the presence of the channel pulse gated through valve 41. If the calling subscriber were now to abandon the call by open-circuiting his line, the gated channel pulse would disappear and, valve 41 thereafter remaining non-conducting, valve 51 would become conducting after a period of time dependent on the time constant of the control grid circuit of valve 51. This time constant is made such that valve 51 will not be tronic Engineering" vol. 20, No. 245, July 1948, and in an article entitled "Mercury Delay Lines" by T. K. Sharpless which appeared in the periodical "Electronics" dated November 1947, at page 134.

It will be appreciated by those skilled in the art that practical difficulties arise when attempts are made to construct a multiplicity of timing units, such as the mercury filled delay line, each so stable with respect to the master timing device, namely the KI pulse, that when started said units will remain accurately synchronous with the KI pulse for a long period. It is possible, however, and means will be described to overcome these difficulties by employing a source of synchronising pulses and using these to re-phase the circulating pulse each time it reaches the injection point and so by preventing the cumulative effect of the drift in the delay line, limit the error to that of a single transmission through the line. In this condition, the delay stability of the mercury delay line is adequate for the purpose required.

Valves 40 and 45 of Fig. 3c are the impulse injection and synchronising gates respectively. A negative-going impulse emitted from the common anode circuit of these valves is arranged to be communicated to the suppressor grid of the normally conducting valve 46 thus changing over the trigger valves 46 and 47 from the first position of stability to the second. The anode circuits of the trigger valves 46 and 47 are connected to a balanced static relay comprising the rectifying elements W4, W5, W6 and W7 and associated transformers and resistors in such a manner that when the trigger is in the first position of stability the attenuation between a carrier frequency oscillator CG and an amplifier valve 48 is very great and when the trigger is in the second position of stability said attenuation is rendered small. In consequence, therefore, of changing over the trigger, carrier frequency is admitted to the amplifier 48 until the trigger is changed back. This occurs 8 micro-seconds later by virtue of the incidence at the suppressor grid of valve 47 of the negative-going K2 pulse developed across the resistor R98 and supplied via condenser C41 from the pulse generator PG. The 8 micro-seconds impulse of carrier frequency is amplified at valve 48 and transmitted through the output transformer of that valve to the transmitting quartz plate of the delay line DL. The delay line is constructed to have a delay of ninety-six micro-seconds and, at the end of this time, the impulse of carrier frequency emerges, greatly attenuated, from the receiving quartz plate. After passage through the delay line, the impulse is amplified by valves 49 and 50 and a part of the power rectified at diodes D4 and D5, to produce a positive-going impulse across the resistor R48 sufficient to raise the control grid of valve 45 from cut-off potential to which it is biassed through the potentiometer R49 and R50, connected between earth and negative potential V5, to substantially earth potential. Valve 45 has the cathode earthed and the suppressor grid pulsed continuously through condenser C42 by KI pulses of amplitude substantially equal to the cut-off bias voltage V5 which is applied to the suppressor grid of valve 45 via R51. Since the delay in the supersonic line DL is 96 micro-seconds it follows that valve 45 will be switched on at the control grid before the leading edge of an individual KI impulse occurs at the suppressor grid, and switched off again at the control grid after the said leading edge. A single KI impulse is therefore gated into the anode circuit of valve 45 and develops a negative-going impulse across resistor R40 exactly one hundred micro-seconds after the previous impulse across the resistor. Thus trigger valves 46 and 47 are again changed over and then restored by a K2 impulse and the process continuing as above, it will be seen that circulation having been started will continue until deliberately interrupted provided the delay of the delay line remains within the range 92–100 micro-seconds.

The negative-going pulse which is thus developed on the common anode resistor R40, being developed in the first instance by a channel impulse applied to the control grid of valve 40 and subsequently by impulses gated through valve 45 from the KI pulse at the suppressor of valve 45 is necessarily synchronous with, and comprises impulses which endure for the same periods as the channel impulses which correspond to the particular subscriber who has engaged his line. This negative-going pulse is employed to open the communication gates in order to admit into the line finder the appropriate channel pulse on the common signal circuit G and to emit from the line finder a synchronous channel pulse into the common signal circuit R. The communication gates comprise the pairs of valves 41 and 43, 42 and 44. Valves 41 and 42 are amplifiers, valve 41 having a control grid circuit connected with the common signal circuit G and individual anode circuit while valve 42 has an individual control grid circuit and anode circuit connected to the common signal circuit R. In both cases the anode supply potential is earth, while the cathode supply potential V5 is negative with respect to earth. With no input signal and with valve 43 removed, the control grid of valve 41 is biased to cut-off by means of the potential V6, see Fig. 3a, and the cathode resistor R47 is so chosen that a positive-going channel pulse of standard amplitude will raise the potential on the control grid into the range of potentials within which valve 41 amplifies saitsfactorily. The control grid of valve 42 is also normally biased to cut off, the potential on the earth phantom of the return pair being, under these conditions, such in conjunction with the potential V8 and the potentiometer R61 and R62 as to produce the necessary bias via the secondary winding of the transformer T5. When, as will be seen, the called subscriber answers, the potential of the earth phantom of pair SR is raised to a level sufficient to ensure that the rectifier W8 conducts and so clamps the bias of the control grid of valve 42 at the potential V5 in which condition valve 42 amplifies satisfactorily. In addition to the switching operations performed on valves 41 and 42 by the changes in control grid bias above described, both valves are normally rendered non-conducting by the cathode-biasing action of the valves 43 and 44. These valves have their anodes connected direct to the supply potential V1 and their control grids biased via resistor R46 and supply potential V7 which is positive with respect to V5. The cathodes of valves 43 and 44 are connected to the cathodes of valves 41 and 42 respectively. Such is the bias voltage V7 that, in the absence of any potential superimposed on it, the cathodes of valves 43 and 44 and therefore those of 41 and 42 are held so far positive with respect to V5 that valve 41 is maintained cut off even when there are incident at the control grid of that valve channel impulses of the maximum amplitude which may be expected. When, however, a line finder is engaged and is, therefore, developing across resistor R40 a negative going pulse synchronous with the channel pulse to be selected, each impulse of this negative-going pulse is superimposed, via condenser C47, on the bias applied to the control grids of valves 43 and 44, which valves are consequently cut off thereby enabling valves 41 and 42 to amplify during the duration of the impulse. These are the means according to the invention by which selection of a wanted channel is effected.

The selected channel pulse which is gated through valve 41 is then passed through a low-pass filter 400 and amplifier 500 of similar constructions to those 112′ and 113′ described in relation to the subscriber's exchange apparatus, and the voice frequencies so extracted are transmitted via the transformer T4 to the pair SG.

Another feature is the means by which pulse circulation is started in the line-finder. If reference is made to Fig. 3*a* it will be observed that channel impulses, after polarity inversion at valve 31, are served to the control grids of both cathode followers 32 and 33. The cathode follower 32 applies signals to the common calling pulse circuit, lead C, and it will be observed that although normally biased close to cut-off by potential V4 via resistors R9 and R7, at which bias valve 32 satisfactorily amplifies the channel pulse, the application of an impulse of alternating current to the pairs PS will, after said pulse has been amplified, at transformer T6 and valve 37, and rectified at transformer T3 and diodes D2 and D3, result in superimposing a negative-going impulse on the bias of valve 32. The amplitude of the negative-going impulse so obtained is sufficient to render valve 32 non-conducting even when served with a channel impulse of the maximum amplitude to be expected. The pair PS is common to all line finders, which communicate to it, via decoupling resistors such as R63 and R64 shown in Fig. 3*c*, a proportion of the power of the 8 micro-second pulse of carrier frequency which emerges from the amplifier following the mercury delay line. Thus is the gate valve 32 prevented from passing to the common calling pulse circuit C any channel pulse which is already in circulation in a line finder.

It will now be apparent that when any subscriber originates a call the channel pulse allocated to him will appear on the calling highway C until he becomes connected to a line finder when by virtue of the above described means the said channel pulse will be barred from the common calling pulse circuit. Referring again to Fig. 3*c* the common calling pulse circuit C is connected via condensers such as C40 to the control grids of valves such as valve 40 in each line finder. Valve 40 is the means by which an impulse appearing on the common calling pulse circuit may be injected into the circulation system of the line finder marked by the trunk marker LFA. As has been said, valve 40 has the anode connected via the anode resistor R40 to the supply potential V1, and the cathode to a tapping in the potentiometer comprising resistors R43, R44, and R45, said potentiometer being connected between the supply potentials V1 and V5. A second tapping in the potentiometer is connected to the contact X of the trunk marker the potentials V1 and V5 and the resistors of the potentiometer being so designed that when a first selector is not marked by the trunk marker the cathode of valve 40 is held at a potential so far positive with respect to the control grid that valve 40 is cut off so that it is not affected by the maximum amplitude of channel impulse which may appear via condenser C40 and when a line finder is marked by the trunk marker cathode of valve 40 is brought to a potential, relative to the control grid such that valve 40 is then at cut-off point and is thus enabled to respond to a positive-going impulse applied via condenser C40. This potential of the cathode of valve 40 in the marked condition is stabilized at the supply potential V3 by the rectifier element W2 which conducts when the potential of lead X is held at earth potential. The control grid of valve 40 is normally biased to earth potential via resistors R41 and R42, a condition, however, which is immediately modified after impulse injection into the line finder has taken place, for a proportion of the power of the pulse of carrier frequency transmitted to the mercury delay line DL obtained via the potentiometer R52 and R53 is rectified by diode D9 and, consequently, a negative going potential is rapidly developed across resistor R42 thus biasing back the control grid of valve 40 sufficiently to prevent the injection of a second channel in pulse, originated by a second calling subscriber, before the trunk marked LFA has moved on and so unmarked the selector. Resistor R42 is shunted by a condenser C43 which, in addition to providing smoothing for the rectifier D9, is made so large that the negative potential developed across R42 decays only by a small amount between successive impulses of carrier frequency thus maintaining valve 40 cut-off at the control grid whilst the line finder is held. This feature prevents injection into a line finder of impulses of more than one channel pulse.

The condenser C48 connected between the cathode of valve 40 and earth is provided to decouple the cathode resistance during the period of pulse injection.

Another feature of the arrangement consists in the transmission through the line finder of the calling and holding and clearing signals. When a line finder becomes connected to a calling subscriber as described above the negative-going potential developed across R42, in addition to closing the injection gate i. e. valve 40, is communicated to the control grid of the normally conducting valve 51 via condenser C44. The anode of valve 51 is connected to the supply potential V1 via resistor R63, the control grid of this valve to earth via resistor R54 and the cathode directly to earth. The negative-going potential communicated via condenser C44 is sufficient to cut-off valve 51 and, such is the time constant at the control grid of valve 51, the negative potential there decays but slowly and is in fact arrested in its decay by the action of the channel pulse gated through valve 41 continually discharging the condenser C44 via the diode D7 and resistor R55. Resistor R55 is provided to limit the current drawn by the diode D7 to a value insufficient to cause appreciable distortion to the channel pulse gated through valve 41. Valve 51 is therefore rapidly rendered non-conducting when the selector becomes engaged and is maintained in that condition by the presence of the channel pulse gated through valve 41. If the calling subscriber were now to abandon the call by open-circuiting his line, the gated channel pulse would disappear and, valve 41 thereafter remaining non-conducting, valve 51 would become conducting after a period of time dependent on the time constant of the control grid circuit of valve 51. This time constant is made such that valve 51 will not be rendered conducting during the temporary absence of the selected channel pulse caused by the standard breaks in a dialled signal but will be rendered conducting if the said pulses remain absent for an appreciably longer period, thereby identifying the clearing condition. The rise in anode potential of valve 51 when the linefinder becomes engaged is used to pass forward over the pair SG a positive-going potential, obtained via the potentiometer R58 and R59, which is connected, between the anode of valve 51 and the supply potential V5; this positive-going potential, as will be seen causes the calling signal to be applied to the called subscriber's line. In addition the said rise in potential is communicated via condenser C46 to the control grid potentiometer of the trigger valve 47 where it is absorbed without disturbing the trigger by the rectifier element W3. When the calling subscriber eventually clears and valve 51 becomes conducting the resulting negative-going potential developed at the anode of 51 is communicated to the control grid of valve 47 and there holds valve 47 cut-off for a period greater than the multiplex period and by so interrupting circulation, releases the line finder.

Another feature of the line finder consists in the provision of means for the detection of dialled impulses. To the anode of the valve 41 is connected, via a resistor R56, a diode D8 by means of which, when the line finder becomes engaged, a negative potential is developed on the control grid of valve 52 sufficient to render that valve non-conducting so that the normally operated relay A is released. The cathode of valve 52 is earthed and the control grid also earthed via resistor R57. Resistor R57 is shunted by a condenser C45, the time constant of this combination being such that valve 52 is switched, and relay A satisfactorily operated, by each break caused by dialling. The purpose of the resistor R56 is similar to that of R55, to limit the flow of current through the diode D8.

Before describing the purpose of the mechanically operated switch and relays in the line finder circuit reference will be made to the selectors. Examination of Fig. 3*d* shows that each selector is connected to the common signal circuits G and R of the multiplex via communication gates 410, 430 and 420, 440 which are similar to the gates 41, 43, and 42 and 44 of the line finders. Furthermore, the circulating system and pulse injection arrangements are also similar to those in the line finders. A difference, however, occurs in the release arrangements.

The control grid potentiometer of the normally non-conducting valve, 470, of the trigger valves 460, 470 in a selector is connected at one end to the anode of the other trigger valve 460 and at the other end to the tapping point of a second potentiometer R67 and R66. This second potentiometer is connected between a supply potential V8 which is negative with respect to V5, and the earth phantom of the pair SG. When the said earth phantom is raised in potential by the calling and holding signal passed forward from the associated line finder the tapping point of the potentiometer R67 and R66 is raised substantially to the potential V5 in which condition the trigger is able to operate satisfactorily but when the said calling and holding signal is removed the potential at the tapping point of R67 and R66 is so reduced that the trigger is unable to operate.

Valve 54, Fig. 3*d* has its control grid connected to the earth phantom of the pair SG and its cathode to the supply potential V3. The anode of valve 54 is connected to a tapping in the potentiometer R430, R440, R450 controlling the injection gate 400 as is the lead X connected to the similar potentiometer R43, R44, R45, in the line finder circuit. In the released condition of the selector valve 54 is non-conducting and the cathode of the injection gate valve 401 is then so positive with respect to the associated control grid that injection is prevented. When, however, the calling and holding signal is extended from the line finder, valve 54 becomes conducting and so modifies the cathode bias of the injection gate that injection is then permitted.

It is now clear that if a selector is prepared by the receipt of a calling and holding signal from the associated line finder, then any positive-going channel impulse of correct amplitude appearing on the common marking pulse circuit SM will be injected into and thereafter circulated within the said selector which by virtue of the transmit and receive gates 410, 420 now becomes connected to the subscriber who has been allocated a channel pulse synchronous with that appearing on the circuit SM and injected into the selector at valve 401.

The calling and holding signal, being present on the earth phantom of the pair SG, raises the grid bias on the valve 420 in Fig. 3*d* to the operating point, thus causing said gate to emit a channel pulse into the common signal circuit R and this channel pulse, being synchronous with that of a particular subscriber, will be distributed to him and by causing the release of the relay S, in his exchange apparatus, cause him to be called. When the called subscriber answers he causes to be emitted into the common signal circuit G connected with the selector of Fig. 3*d* the channel pulse allocated to him, which is thus gated through the valve 410 of the appropriate selector and by rendering valve 510 non-conducting in manner similar to that described with reference to the line finder of Fig. 3*c* causes a rise in potential of the earth phantom of the pair SR. This, as has been described, results in the release of the S relay of the calling subscriber thus giving the answering signal.

When a calling subscriber becomes connected to a line finder and dials the number of the wanted subscriber, the channel pulse appropriate to the wanted subscriber is made to appear on the common marking pulse circuit SM. Referring to Fig. 3*a*, valves 21 to 30 have a common anode resistor R68 and are connected through the resistor and the de-coupling resistance and condenser combination R69 and C50 to the supply potential V1. The cathodes of valves 21 to 30 are earthed and the control grids, each joined via a resistor to a supply potential V4, negative with respect to earth sufficiently to cut off the associated valves. The control grids are also multipled, leads M1 to M10, over the bank contacts DS2 of digit switches, DS, of which one is provided for each line finder. Valves 21 to 30 have the suppressor grids directly connected to those of the multiplex modulator valves 1 to 10, respectively, and if the control grid potential of valve 21 is raised by the application of earth potential to the corresponding bank contact in any of the digit switches, then valve 21 will emit a negative-going pulse into the common anode circuit, the impulse of this pulse being synchronous with the impulses of the channel pulse of the subscriber associated with valves 1 and 11. Similarly by the application of earth potential to any of the leads M1 to M10 may the corresponding channel pulses be made to appear in the common anode circuit of valves 21 to 30. Impulses appearing in this anode circuit are first polarity-inverted by the amplifier 38 and then communicated via the cathode follower 39 to the circuit SM. In order to connect a selector to a particular subscriber it is necessary to apply earth potential to the appropriate lead M1 to M10 and at the same time to extend the calling and holding signal from the associated line finder.

Reference to Fig. 3*d* shows that the eight micro-second impulses of carrier frequency emerging from the delay line output amplifier of the engaged selectors, in addition to providing the rectified impulse necessary for the maintenance of circulation, are communicated via leads PSO and decoupling resistors to the common pulse suppression circuit PS. As has been described the similar pulse circulating in the line finders are also made to appear on the circuit PS, and it will be clear then that the transformer TS, served by the circuit PS, will transmit the eight micro-second, carrier-frequency versions of the channel pulses of all the engaged subscribers in the exchange. These pulses are rectified by diodes D2 and D3 to produce negative-going pulses across the resistor R9 and, since R9 is part of the total grid leak resistance of the cathode follower valve 39 and because the impulses of these impulses occur in advance of the related channel pulses and endure until after said channel impulses have passed, they so modify the grid bias of valve 39 as to prevent the transmission into the circuit SM of any channel pulse already engaged. This constitutes the means whereby a called subscriber's line is tested for the engaged condition before being connected to a selector.

Referring again to Fig. 3*c*, when a subscriber becomes connected to a linefinder the normally non-conducting valve 53 is rendered conducting by virtue of the connection between the control grid of that valve and the earth phantom of the pair SG. Relay E operates and at contacts E1 extends earth potential over lead W to the trunk marker uniselector banks. In addition to the above the act of engaging a line finder causes release of the normally operated impulse accepting relay A as already described. After a short delay the slow-to-release guard relay B operates over contacts A1 and operates the common cut-off relay CO in the trunk marker by closing contacts B1 thereby preventing at contacts CO1 the marking over lead X of a line finder to take the next call. As will be seen, relay CO remains operated during the time taken to make the connection between two subscribers. Operation of relay B also open-circuits the circuit including the homing arc, DS3 at contacts B2, prepares the digit switch driving circuit at contacts B3 and prepares the hold circuit of relay MF at contacts B4. On the first break in the dialled train relay A operates and completes the driving circuit of digit switch driving magnet DS at contacts A1 via contacts B3, the home contact of the arc DS1, series relay C to the driving magnet DS. Slow-to-release relay C operates, closes contacts C3 and relay CC operates. The switch steps at the end of the dial break when relay A is again released. Subsequent breaks of the dial train maintain relay C operated and step the switch via the arc DS1 and the contact C4. At the end of the train of impulses relay C releases and somewhat later relay CC releases. In the interval, i. e. the release time of relay CC, relay MF operates via contacts C1 and CC1 and locks over contacts MF2 and B4. Operation of relay MF initiates release of relay CO at contacts MF1. Also during the release time of relay CC earth potential is extended via contacts C2, CC2 and the arc DS2 to the appropriate lead M1 to M10. Thus depending on the digit dialled is connection made to the wanted subscriber the marking pulse of the called subscriber, if free, being injected into the selector as described. In the event of that subscriber being engaged, no pulse appears on the circuit SM during the release time of relay C and in consequence no connection is made. When relay C releases, the driving circuit is opened at contacts C4 so that any further dialling is ineffective.

Release of the connection is under the control of the calling subscriber for when he open circuits his line the channel pulse gated through the valve 41 of the line finder, reduces to zero amplitude. Relay A then operates and initiates the release of slow relay B. Valve 51 becomes conducting and the resulting fall in potential at the anode produces via condenser C46 a negative-going impulse, at the control grid of valve 47, which, as has been described prevents operation of the trigger and so stops impulse circulation. In addition the fall in potential at the anode of valve 51 removes the calling and holding condition from the earth phantom of the pair SG and so stops impulse circulation in the selector, and also by rendering valve 53 non-conducting releases relay E and so by removing earth potential from lead W renders the line finder available to handle another call. Meanwhile relay B releases, releasing relay MF at contact B4 and at contacts B2 completing the homing circuit of the digit switch.

Referring again to Figs. 3*a* and 3*c*, it will be clear that these figures disclose a switch having a selector side (Fig. 3*c*, right of commons C, G and R), a bank side (Fig. 3*a*, left of commons C, G and R) and a common bus section (C, G and R) therebetween. Also that the selector side comprising a plurality of link circuits each presenting outwardly extending main and signal entry trunk means (SR and phantom to 42, LFA to 40) and main and signal exit trunk means (41 to SG and phantom), while the bank side comprising a plurality of bank circuits each presenting outwardly extending main and signal entry trunk means (Fig. 3*a*, W1, R2 leads to gates 1–10) and main and signal exit trunk means (Fig. 3*a*, left from tubes 11–20). Further, that each selector side and bank side circuit has at its inner end exit and entry trunk gating means (e. g. gates 41 and 42, and gates 1–10 and 11–20); the gating means of the several bank circuits (1–10 and 11–20) being operable in time division multiplex sequence, and the gating means of each of the selector circuits being operable in synchrony with the time division channel of any one of the bank circuits. Also that the signals from any of the bank side circuits gated to the common bus G at 1–10 are presented to the exit gates 41 of all the selector side circuits, while those from all the selector side circuits, gated to the common bus at 42, are presented to the exit gates 11–20 of all the bank circuits. Clearly, also, each bank circuit comprises means (the cathode has connections in tubes 1–10) responsive to a signal entering through that bank side circuit (W1–R2) for initiating production of channel pulses on common bus G on its own time division channel, and each selector side circuit comprises means responsive to a signal entering through its signal entry trunk means (LFA to 40) and to channel pulses of a bank circuit (over common bus C to 40) for operating its gating means 41—42 in synchrony with such channel pulses, the switch further comprising call isolating means, shown as the pulse suppression means 32 associated with the bus C, that blocks from the signal responsive means 40 of all selector side circuits the channel pulses of a signal that has already engaged one selector side circuit.

Still referring to the switch of Figs. 3*a* and 3*c*, it is clear that the pulse circulating circuit through D.L. constitutes a synchronous channel pulse generator, having a pulse injection gate 40 conditioned by the marking signal from LFA to admit a channel pulse from C, and connected for operating the selector side gates 41 and 42 in synchrony therewith, and further including means shown as the circuit from D9 through R41 for blocking its pulse injection gate when it is generating pulses synchronous with those of a communicating channel.

Referring now to Figs. 3*a* and 3*d*, it will be clear that these figures together disclose a second switch generally the same as that just discussed, having generally similar selector side circuits SG and SR and their phantoms, and generally similar bank side circuits (common to the first switch in the illustrative embodiment of Figs. 3*a* through 3*d*); and that the two switches together, with their selector sides interconnected through SG and SR and their phantoms, and with controlling markers LFA and SM, constitute a switching system of an exchange.

As will further be evident to those skilled in the art, the embodiments herein set forth are illustrative and not restrictive of the invention, the scope of which is defined in the appended claims, and all modifications that come within the meaning and range of equivalency of the claims are intended to be included therein.

I claim:

1. Automatic telephone equipment, comprising a common transmit circuit and a common receive circuit; a plurality of subscribers' stations including lines each comprising a transmit trunk and a receive trunk; time division multiplex apparatus comprising a pulse transmit gate for each transmit trunk, said gates interposed between said trunks and said common transmit circuit, a corresponding pulse receive gate for each of said receive trunks, said receive gates being interposed between said common receive circuit and said receive trunks, a common called channel marker circuit and connected thereto a called channel marker gate for each subscriber channel; said time division multiplex apparatus further including pulse generating means for simultaneously unblocking the transmit, receive and channel marker gates of the respective subscribers in time spaced order; said pulse transmit gates comprising second blocks respectively removed by energization of the transmit trunks connected thereto; a plurality of line finders, said line finders each comprising a pulse injector and transmit and receive gates for the calling channel; a calling channel marker circuit extending from said common transmit circuit and commoned to said pulse injectors, said common transmit circuit also being commoned to the transmit gates of said line finders, and the receive gates of said line finders being connected to said common receive circuit; means for marking the pulse injector of an idle line finder for receiving an impulse from said calling channel marker, impulse circulating means responsive to the so-received impulse and to the pulse generating means for opening the calling channel gates of said line finder in synchrony with the pulse channel impulses of a calling subscriber's station; said subscribers' stations comprising make and break dial equipment, each line finder comprising digit switch means responsive to the dial interrupted calling signal passed by the transmit gate of its associated line finder, said digit switch removing a block from the called channel marker gate of the called subscriber; said line finders each having a selector associated therewith and said selectors each comprising a pulse injector and transmit and receive gates for the called channel; said selector pulse injectors being commoned to said common called channel marker circuit and said selector transmit and receive gates being commoned, respectively, to common transmit and receive circuits; each of said line finders comprising means for demodulating speech components of the signals passed by the transmit gate of said line finder and means for connecting the demodulated output thereof to the receive gate of its associated selector; said selectors each comprising impulse circulating means responsive to the called channel marker admitted through its injector from said called channel marker circuit and to the pulse generator for opening the receive and transmit gates thereof in synchrony with the pulse channel of a called subscriber's station; and said selectors each comprising means for demodulating speech components of the signals passed by the transmit gate of said selector and means for connecting the demodulated output thereof to the receive gate of its associated line finder; whereby the pulse modulated signal produced only by a calling station and said time division multiplex apparatus is transmitted to an idle line finder and gated thereby on the time division channel of the calling station, the gated calling signal being then applied to select the time division channel for the called subscriber and to provide demodulated components that are pulse gated on the so-selected called subscriber's time division channel; and whereby the pulse modulated signal produced only by the answering called station and the multiplex apparatus is gated by the associated selector on the called station's time division channel and is applied to produce demodulated speech components that are pulse gated on the calling subscriber's time division channel.

2. Automatic telephone equipment according to claim 1, in which the impulse circulating means of each line finder comprises means for blocking its pulse injector despite continued marking thereof, as soon as an impulse has been received therethrough.

3. Automatic telephone equipment according to claim 1, in which the common calling channel marker circuit comprises a pulse suppression gate and means responsive to circulation of impulses in the impulse circulating circuits of said line finders for suppressing transmission through said pulse suppression gate of further impulses of a calling signal that has engaged a line finder.

4. Automatic telephone equipment according to claim 1, including means for generating a long impulse on cessation of marking signals as a clearing signal, and means responsive to said clearing signal to terminate the operation of said impulse circulating means.

5. Automatic telephone equipment according to claim 4, in which each line finder further comprises timing circuit means for differentiating between dialing and clearing signals gated thereto by the transmit gate of such line finder.

6. Automatic telephone equipment according to claim 1, in which each of said line finders comprises means responsive to engagement of the line finders by a calling channel for producing a further signal and means for applying said further signal to the receive gate of its associated selector, and in which said selector receive gate is inoperable to pulse gate on the called subscriber's time division channel the demodulated components of a calling signal in the absence of application of said further signal thereto.

7. Automatic telephone equipment according to claim 6, in which said further signal producing means produces a continuous signal that, for the duration thereof, continuously maintains said selector receive gate operable to pulse gate said demodulated calling signal components.

8. Automatic telephone equipment according to claim 1, in which each of said selectors comprises means responsive to an answer on the called channel for producing a further signal and means for applying said further signal to the receive gate of its associated line finder, and in which said line finder receive gate is inoperable to pulse gate on the calling subscriber's time division channel the demodulated components of the answering station's signal in the absence of application of said further signal thereto.

9. Automatic telephone equipment according to claim 8, in which said further signal producing means produces a continuous signal that, for the duration thereof, continuously maintains said line finder receive gate operable to pulse gate said demodulated answering signal components.

10. Automatic telephone equipment according to claim 1, in which each of said line finder pulse injectors comprises means for blocking its reception of an impulse from the calling channel marker circuit and in which the line finder marking means renders inoperative the blocking means of the respective pulse injector to which it is connected, and further comprising a signal generator responsive to engagement of such line finder and means operable thereby to transfer connection of the line finder marking means to another line finder to thus restore the operation of the pulse injector blocking means of the line finder previously marked thereby.

11. A switch having a selector side, a bank side, and a common bus section therebetween; the selector side comprising a plurality of circuits each presenting outwardly extending main and signal entry trunk means and main and signal exit trunk means for conveying signals to and from the switch, the bank side comprising a plurality of bank circuits each presenting outwardly extending main and signal entry trunk means and main and signal exit trunk means for conveying signals to and from the switch, and each of said selector circuits and bank circuits having at its inner end exit and entry trunk gating means; the gating means of the several bank circuits being operable in time division multiplex sequence for producing signal pulses on different time division channels at the inner end of each bank circuit, and the gating means of the several selector circuits each being operable on any selected one of the said time division channels; the common bus section comprising common bus means for receiving gated signals from any number of the bank circuits, each as channel pulses on its own time division channel, and presenting the same to the exit gating means of all the selector circuits, and the bus section further comprising common bus means for receiving gated signals from any number of the selector circuits each as channel pulses on its selected time division channel, and presenting the same to exit gating means of all the bank circuits; each bank circuit comprising means responsive to a signal entering therethrough for initiating the production of channel pulses on its own time division channel; each selector circuit comprising means responsive to a signal entering through its signal entry trunk means and to channel pulses of a bank circuit for operating the gating means of said selector circuit in synchrony with the channel pulses of the initiating bank circuit, thereby to establish communication between the initiating bank and selector circuits being synchronously gated to the common bus means, and said switch comprising call isolating means operable for the duration of such communication between a particular one of the bank side circuits and a particular one of the selector side circuits for preventing other selector side circuits from responding to and synchronizing with the channel pulses of the particular bank circuit.

12. A switch according to claim 11, in which the means responsive to a signal entering through signal entry trunk means of a selector circuit and to channel pulses of a bank circuit, comprises a synchronous channel pulse generator having a pulse injection gate conditioned, by the signal entering through said signal entry trunk means of the selector circuit, to admit a bank circuit derived channel pulse for initiating operation of the pulse generator in synchrony with the initiating bank circuit pulse channel, said pulse generator being connected for operating the gating means of the selector circuit in synchrony with that of the bank circuit from which the initiating pulse was derived, and in which each selector circuit further comprises means responsive to operation of its synchronous channel pulse generator for blocking its pulse injection gate.

13. A switch according to claim 12 in which the synchronous pulse generator comprises a complete pulse circulating circuit excluding the pulse injection gate.

14. A switch according to claim 12 in which the synchronous pulse generator comprises a complete pulse circulating circuit excluding the pulse injection gate and including a delay line.

15. A switch according to claim 14 in which the means for blocking the pulse injection gate is connected to said circulating circuit ahead of said delay line.

16. A switch according to claim 11, in which the common bus means comprises a first bus that presents the channel pulses from the bank circuits to the exit trunk gating means of all selectors and a second bus that presents the channel pulses from the bank circuits to the pulse injection gates of the synchronous pulse generators; and in which said call isolating means comprises pulse suppression means in said second bus and means responsive to generation of synchronous pulses in a selector side circuit for actuating said pulse suppression means for suppressing transmission of like pulses through said second bus of the common bus section.

17. A switch according to claim 11 in which each main exit trunk means comprises means for demodulating the channel pulses gated thereto to reproduce modulations present in the signal that produced the channel pulses, and in which each exit signal trunk means comprises means responsive to the channel pulses gated thereto for producing a control signal thereon.

18. An automatic telephone exchange comprising two switches according to claim 17, a path including links connecting the selector circuits of one switch with those of the other, calling circuits connected to the bank circuit of one switch, called circuits connected to the bank circuits of the second switch, a free link marker associated with the signal trunks of the selector circuits of the first switch for designating an idle link between the switches and conditioning the selector circuit of the first switch associated with such idle link for responding to a channel pulse of a calling subscriber's bank circuit, each selector circuit of the first switch, on so responding, applying a forward marking control signal through its associated path to the selector circuit of the second switch to mark the latter for connection; digit registering means associated with the selector circuits of the first switch, and responsive to dial interruptions of the gated calling signal for registering a number designating a called bank circuit of the second switch; and marking means controlled by said registering means for initiating operation of the forwardly marked selector circuit of the second switch on the time division channel of the called bank circuit thereof to establish communication between the calling bank circuit of the first switch and the called bank circuit of the second switch.

19. An automatic telephone equipment of the type comprising a plurality of subscribers' lines each including transmit and receive trunks and each capable of calling and of being called by any one of the others, and in combination: a line finder switch comprising a first common signal circuit and a time division multiplexing apparatus including a set of gating means interposed in circuit between said transmit trunks and said common signal circuit, said gating means each including first and second blocks, said first blocks being periodically removed in timed order by said multiplexing apparatus and said second blocks being removed respectively by energization of the associated transmit trunk, said line finder switch further including a second common signal circuit and a second set of gating means interposed respectively in circuit between said second common signal circuit and said receive trunks, said multiplexing apparatus opening the gating means associated within the receive trunks of respective subscribers lines synchronously with its removal of the first block from the gating means associated with the transmit trunk of such subscribers' lines; each line finder switch comprising a plurality of line finders; each line finder comprising a pulse injector, means for producing timing pulses put into operation by the reception of a pulse through said pulse injector, said pulse injector being unresponsive to signals from said first common signal circuit except when marked; line finder marker means for marking an unengaged line finder, said marker means rendering the pulse injector of the marked line finder receptive of a signal pulse from said first common signal circuit for initiating operation of said timing pulse producing means in synchrony with the time division channel of such signal pulse; said line finder switch comprising means for preventing a marked line finder from responding to a pulse on a time division channel in synchrony with which another line finder is operating, and each line finder comprising communication gates cyclically opened by the output of its timing pulse producing means and establishing synchronous communication with said first and second common signal circuits, respectively.

20. A combination according to claim 19, each line finder having a selector associated therewith, each selector comprising a pulse injector, means for producing timing pulses put into operation by the reception of a pulse through said pulse injector and a receive gate cyclically opened by the output of the timing pulse producing means of the selector, each line finder comprising means responsive to dial interruption of signals passed by its communication gate for supplying to the pulse injector of its associated selector an impulse timed to operate the timing pulse producing means of said selector in synchrony with the time division channel of a called subscriber's line; and each line finder comprising means for demodulating the pulse modulated signals passed by the communication gate of the line finder and for delivering the demodulated signal to the communication receive gate of its selector for modulation thereby on the time division channel of the called subscriber.

THOMAS HAROLD FLOWERS.

References Cited in the file of this patent

UNITED STATES PATENTS

| Number | Name | Date |
|---|---|---|
| 2,023,589 | Hersey | Dec. 10, 1935 |
| 2,136,441 | Karolus | Nov. 15, 1938 |
| 2,172,354 | Blumlein | Sept. 12, 1939 |
| 2,202,474 | Vroom | May 28, 1940 |
| 2,291,752 | Parker | Aug. 4, 1942 |
| 2,317,471 | Meacham | Apr. 27, 1943 |
| 2,344,612 | Hartley | Mar. 21, 1944 |
| 2,345,048 | Hubbard | Mar. 28, 1944 |
| 2,348,131 | Horton | May 2, 1944 |
| 2,387,018 | Hartley | Oct. 16, 1945 |
| 2,434,989 | Christian | Jan. 27, 1948 |
| 2,462,896 | Ransom | Mar. 1, 1948 |
| 2,490,833 | Ransom | Dec. 13, 1949 |
| 2,492,136 | Deloraine et al. | Dec. 27, 1949 |
| 2,492,179 | Ransom | Dec. 27, 1949 |
| 2,492,180 | Ransom | Dec. 27, 1949 |
| 2,492,344 | Adams et al. | Dec. 27, 1949 |
| 2,506,612 | Ransom | May 9, 1950 |
| 2,506,613 | Ransom | May 9, 1950 |

FOREIGN PATENTS

| Number | Country | Date |
|---|---|---|
| 566,445 | Great Britain | Dec. 29, 1944 |
| 567,964 | Great Britain | Mar. 9, 1945 |
| 568,476 | Great Britain | Apr. 6, 1945 |
| 613,617 | Great Britain | Dec. 1, 1948 |